United States Patent
Suffin et al.

(10) Patent No.: US 6,633,996 B1
(45) Date of Patent: Oct. 14, 2003

(54) FAULT-TOLERANT MAINTENANCE BUS ARCHITECTURE

(75) Inventors: A. Charles Suffin, West Boylston, MA (US); Joseph S. Amato, Worcester, MA (US); Paul Joyce, Marlborough, MA (US)

(73) Assignee: Stratus Technologies Bermuda Ltd., Hamilton (BM)

( * ) Notice: Subject to any disclaimer, the term of this patent is extended or adjusted under 35 U.S.C. 154(b) by 0 days.

(21) Appl. No.: 09/548,536

(22) Filed: Apr. 13, 2000

(51) Int. Cl.$^7$ ............................................... G06F 11/00
(52) U.S. Cl. ............................. 714/4; 370/228; 714/43
(58) Field of Search ................................. 714/43, 56, 2, 714/4; 710/100, 300, 105, 107; 370/228

(56) References Cited

U.S. PATENT DOCUMENTS

| | | | |
|---|---|---|---|
| 3,544,973 A | 12/1970 | Borck, Jr. et al. | 340/172.5 |
| 3,548,176 A | 12/1970 | Shuttler | 235/153 |
| 3,641,505 A | 2/1972 | Artz et al. | 340/172.5 |
| 3,710,324 A | 1/1973 | Cohen et al. | 340/172.5 |
| 3,736,566 A | 5/1973 | Anderson et al. | 340/172.5 |
| 3,795,901 A | 3/1974 | Boehm et al. | 340/172.5 |
| 3,805,039 A | 4/1974 | Stiffler | 235/153 AE |
| 3,820,079 A | 6/1974 | Bergh et al. | 340/172.5 |
| 3,840,861 A | 10/1974 | Amdahl et al. | 340/172.5 |
| 3,997,896 A | 12/1976 | Cassarino, Jr. et al. | 340/172.5 |
| 4,015,246 A | 3/1977 | Hopkins, Jr. et al. | 340/172.5 |
| 4,032,893 A | 6/1977 | Moran | 340/166 R |
| 4,059,736 A | 11/1977 | Perucca et al. | 179/175.2 R |
| 4,128,883 A | 12/1978 | Duke et al. | 710/105 |
| 4,228,496 A | 10/1980 | Katzman et al. | 364/200 |
| 4,245,344 A | 1/1981 | Richter | 371/68 |
| 4,263,649 A | 4/1981 | Lapp, Jr. | 364/200 |
| 4,275,440 A | 6/1981 | Adams, Jr. et al. | 364/200 |
| 4,309,754 A | 1/1982 | Dinwiddie, Jr. et al. | 364/200 |
| 4,366,535 A | 12/1982 | Cedolin et al. | 364/200 |
| 4,434,463 A | 2/1984 | Quinquis et al. | 364/200 |
| 4,449,182 A | 5/1984 | Rubinson et al. | 364/200 |
| 4,453,215 A | 6/1984 | Reid | 364/200 |
| 4,467,436 A | 8/1984 | Chance et al. | 364/513 |
| 4,484,273 A | 11/1984 | Stiffler et al. | 364/200 |
| 4,486,826 A | 12/1984 | Wolff et al. | 364/200 |

(List continued on next page.)

FOREIGN PATENT DOCUMENTS

| | | | | |
|---|---|---|---|---|
| EP | 0 301 499 A2 | 2/1989 | | G06F/11/16 |
| EP | 0 428 330 A2 | 5/1991 | | G06F/13/30 |
| EP | 0 475 005 B1 | 11/1995 | | G06F/15/16 |
| EP | 0 293 860 B1 | 2/1996 | | G06F/13/28 |
| EP | 0 390 567 B1 | 6/1999 | | H04L/29/06 |
| GB | 2 060 229 A2 | 4/1981 | | G06F/3/00 |
| WO | WO 97/24677 | 7/1997 | | G06F/13/00 |
| WO | WO 98/21660 | 5/1998 | | G06F/13/00 |
| WO | WO 99/59066 | 11/1999 | | G06F/11/20 |
| WO | WO 99/66410 | 12/1999 | | G06F/11/22 |

Primary Examiner—Robert Beausoliel
Assistant Examiner—Gabriel Chu
(74) Attorney, Agent, or Firm—Testa, Hurwitz & Thibeault, LLP

(57) ABSTRACT

A fault-tolerant maintenance bus architecture provides dual maintenance buses interconnecting each of a plurality of parent circuit boards. The two maintenance buses are each connected to a pair of system management modules (SMMs) that are configured to perform a variety of maintenance bus activities. Within each parent board are a pair of redundant bridges each having a unique address. One bridge is connected to the first maintenance bus while a second bridge is connected to the second maintenance bus of the pair. A child maintenance bus interconnects the two bridges one a child circuit board. The child maintenance bus is itself interconnected with a variety of monitor and control to functions on maintenance bus-compatible subsystem components. The SMMs can address components on each child board individually and receive appropriate responses therefrom. In the event of a bus failure, the other bus can still communicate with child subsystem components via the unaffected bridge.

10 Claims, 3 Drawing Sheets

U.S. PATENT DOCUMENTS

| | | | |
|---|---|---|---|
| 4,503,496 A | 3/1985 | Holzner et al. | 364/200 |
| 4,543,628 A | 9/1985 | Pomfret | 364/200 |
| 4,590,554 A | 5/1986 | Glazer et al. | 364/200 |
| 4,597,084 A | 6/1986 | Dynneson et al. | 371/51 |
| 4,608,631 A | 8/1986 | Stiffler et al. | 364/200 |
| 4,628,447 A | 12/1986 | Cartret et al. | 364/200 |
| 4,630,193 A | 12/1986 | Kris | 364/200 |
| 4,633,394 A | 12/1986 | Georgiou et al. | 364/200 |
| 4,654,857 A | 3/1987 | Samson et al. | 371/68 |
| 4,669,056 A | 5/1987 | Waldecker et al. | 364/900 |
| 4,669,079 A | 5/1987 | Blum | 370/85 |
| 4,700,292 A | 10/1987 | Campanini | 364/200 |
| 4,703,420 A | 10/1987 | Irwin | 364/200 |
| 4,750,177 A | 6/1988 | Hendrie et al. | 371/32 |
| 4,805,091 A | 2/1989 | Thiel et al. | 364/200 |
| 4,809,169 A | 2/1989 | Sfarti et al. | 364/200 |
| 4,816,990 A | 3/1989 | Williams | 364/200 |
| 4,827,409 A | 5/1989 | Dickson | 364/200 |
| 4,866,604 A | 9/1989 | Reid | 710/105 |
| 4,869,673 A | 9/1989 | Kreinberg et al. | 439/64 |
| 4,914,580 A | 4/1990 | Jensen et al. | 364/200 |
| 4,916,695 A | 4/1990 | Ossfeldt | 371/9.1 |
| 4,926,315 A | 5/1990 | Long et al. | 364/200 |
| 4,931,922 A | 6/1990 | Baty et al. | 364/200 |
| 4,939,643 A | 7/1990 | Long et al. | 364/200 |
| 4,974,144 A | 11/1990 | Long et al. | 364/200 |
| 4,974,150 A | 11/1990 | Long et al. | 364/200 |
| 4,985,830 A | 1/1991 | Atac et al. | 364/200 |
| 4,994,960 A | 2/1991 | Tuchler et al. | 364/200 |
| 5,005,174 A | 4/1991 | Bruckert et al. | 714/11 |
| 5,083,258 A | 1/1992 | Yamasaki | 395/725 |
| 5,099,485 A | 3/1992 | Bruckert et al. | 714/11 |
| 5,117,486 A | 5/1992 | Clark et al. | 395/250 |
| 5,138,257 A | 8/1992 | Katsura | 324/158 R |
| 5,179,663 A | 1/1993 | Iimura | 395/250 |
| 5,243,704 A | 9/1993 | Baty et al. | 395/325 |
| 5,247,522 A | 9/1993 | Reiff | 371/29.5 |
| 5,251,303 A | 10/1993 | Fogg, Jr. et al. | 395/275 |
| 5,270,699 A | 12/1993 | Signaigo et al. | 340/825.01 |
| 5,295,258 A | 3/1994 | Jewett et al. | 395/575 |
| 5,313,627 A | 5/1994 | Amini et al. | 395/575 |
| 5,317,726 A | 5/1994 | Horst | 395/575 |
| 5,345,566 A * | 9/1994 | Tanji et al. | 710/306 |
| 5,428,766 A | 6/1995 | Seaman | 395/575 |
| 5,463,755 A | 10/1995 | Dumarot et al. | 395/475 |
| 5,465,340 A | 11/1995 | Creedon et al. | 395/846 |
| 5,537,535 A | 7/1996 | Maruyama et al. | 395/183.01 |
| 5,550,986 A | 8/1996 | DuLac | 395/280 |
| 5,555,372 A | 9/1996 | Tetreault et al. | 395/182.13 |
| 5,572,688 A * | 11/1996 | Sytwu | 710/301 |
| 5,574,865 A | 11/1996 | Hashemi | 395/283 |
| 5,584,030 A | 12/1996 | Husak et al. | 395/750 |
| 5,600,784 A | 2/1997 | Bissett et al. | 395/182.1 |
| 5,613,162 A | 3/1997 | Kabenjian | 395/842 |
| 5,627,965 A | 5/1997 | Liddell et al. | 395/185.01 |
| 5,630,046 A | 5/1997 | Loise | 714/11 |
| 5,630,056 A | 5/1997 | Horvath et al. | 395/185.09 |
| 5,636,342 A * | 6/1997 | Jeffries | 714/48 |
| 5,659,681 A | 8/1997 | Ojima | 395/183.19 |
| 5,671,443 A | 9/1997 | Stauffer et al. | 395/845 |
| 5,696,905 A | 12/1997 | Reimer et al. | 395/227 |
| 5,701,410 A | 12/1997 | BeMent et al. | 395/183.19 |
| 5,701,457 A | 12/1997 | Fujiwara | 395/608 |
| 5,737,601 A | 4/1998 | Jain et al. | 395/617 |
| 5,751,955 A | 5/1998 | Sonnier et al. | 395/200.19 |
| 5,758,065 A | 5/1998 | Reams et al. | 395/185.01 |
| 5,809,256 A | 9/1998 | Najemy | 395/283 |
| 5,812,748 A | 9/1998 | Ohran et al. | 395/182.02 |
| 5,815,647 A | 9/1998 | Buckland et al. | 395/182.01 |
| 5,828,903 A | 10/1998 | Sethuram et al. | 395/817 |
| 5,838,899 A | 11/1998 | Leavitt et al. | 395/185.09 |
| 5,838,900 A | 11/1998 | Horvath et al. | 395/185.09 |
| 5,838,993 A | 11/1998 | Riley et al. | 395/842 |
| 5,862,145 A | 1/1999 | Grossman et al. | 371/5.1 |
| 5,870,301 A | 2/1999 | Yakushiji et al. | 700/3 |
| 5,875,308 A | 2/1999 | Egan et al. | 395/283 |
| 5,875,351 A | 2/1999 | Riley | 395/842 |
| 5,881,251 A | 3/1999 | Fung et al. | 395/283 |
| 5,884,027 A | 3/1999 | Garbus et al. | 709/250 |
| 5,890,003 A | 3/1999 | Cutts, Jr. et al. | 710/263 |
| 5,892,928 A | 4/1999 | Wallach et al. | 710/302 |
| 5,894,560 A | 4/1999 | Carmichael et al. | 395/845 |
| 5,928,339 A | 7/1999 | Nishikawa | 710/26 |
| 5,944,800 A | 8/1999 | Mattheis et al. | 710/23 |
| 5,953,538 A | 9/1999 | Duncan et al. | 395/842 |
| 5,956,474 A | 9/1999 | Bissett et al. | 714/11 |
| 5,956,476 A | 9/1999 | Ranson et al. | 395/183.06 |
| 5,978,866 A | 11/1999 | Nain | 710/22 |
| 5,982,672 A | 11/1999 | Moon et al. | 365/189.01 |
| 5,983,289 A | 11/1999 | Ishikawa et al. | 710/35 |
| 5,991,900 A | 11/1999 | Garnett | 714/56 |
| 5,996,035 A | 11/1999 | Allen et al. | 710/103 |
| 6,000,043 A | 12/1999 | Abramson | 714/44 |
| 6,009,535 A | 12/1999 | Halligan et al. | 714/5 |
| 6,012,120 A | 1/2000 | Duncan et al. | 710/129 |
| 6,021,456 A | 2/2000 | Herdeg et al. | 710/260 |
| 6,026,458 A | 2/2000 | Rasums | 710/103 |
| 6,032,271 A | 2/2000 | Goodrum et al. | 714/56 |
| 6,041,375 A | 3/2000 | Bass et al. | 710/103 |
| 6,047,343 A | 4/2000 | Olarig | 710/102 |
| 6,049,894 A | 4/2000 | Gates | 714/41 |
| 6,055,584 A | 4/2000 | Bridges et al. | 710/27 |
| 6,062,480 A | 5/2000 | Evoy | 235/492 |
| 6,073,196 A | 6/2000 | Goodrum et al. | 710/103 |
| 6,098,137 A | 8/2000 | Goodrum et al. | 710/129 |
| 6,125,417 A | 9/2000 | Bailis et al. | 710/103 |
| 6,141,769 A | 10/2000 | Petivan et al. | 714/10 |
| 6,145,036 A * | 11/2000 | Barenys et al. | 710/300 |
| 6,154,802 A * | 11/2000 | Khosrowpour | 710/312 |
| 6,321,286 B1 * | 11/2001 | Goodrum et al. | 710/311 |
| 6,397,345 B1 * | 5/2002 | Edmonds et al. | 714/4 |
| 6,430,636 B1 * | 8/2002 | Cranston et al. | 710/107 |
| 6,449,729 B1 * | 9/2002 | Sanders et al. | 714/4 |
| 6,505,311 B1 * | 1/2003 | Ichinohe et al. | 714/56 |
| 6,550,017 B1 * | 4/2003 | Moiin et al. | 714/4 |
| 6,564,340 B1 * | 5/2003 | Odegard et al. | 714/43 |

\* cited by examiner

FAULT-TOLERANT MAINTENANCE BUS ARCHITECTURE

BACKGROUND OF THE INVENTION

1. Field of the Invention

This invention relates to fault-tolerant computer systems and more particularto a dedicated maintenance bus for use with such computer systems.

2. Background Information

Fault-tolerant computer systems are employed in situations and environments that demand high reliability and minimal downtime. Such computer systems may be employed in the tracking of financial markets, the control and routing of telecommunications and in other mission-critical functions such as air traffic control.

A common technique for incorporating fault-tolerance into a computer system is to provide a degree of redundancy to various components. In other words, important components are often paired with one or more backup components of the same type. As such, two or more components may operate in a so-called lockstep mode in which each component performs the same task at the same time, while only one is typically called upon for delivery of information. Where data collisions, race conditions and other complications may limit the use of lockstep architecture, redundant components may be employed in failover mode. In failover mode, one component is selected as a primary component that operates under normal circumstances. If a failure in the primary component is detected, then the primary component is bypassed and the secondary (or tertiary) redundant component is brought on line. A variety of initialization and switchover techniques are employed to make a transition from one component to another during runtime of the computer system. A primary goal of these techniques is to minimize downtime and corresponding loss of function and/or data.

Fault-tolerant computer systems are often costly to implement since many commercially available components are not specifically designed for use in redundant systems. It is desirable to adapt conventional components and their built-in architecture whenever possible. All modem computer systems have particular capabilities directed to control and monitoring of functions. For example, large microprocessor chips such as the Pentium III™, available from Intel Corporation of Santa Clara, Calif., are designed to operate within a specific temperature range that is monitored by a commercially availble environmental/temperature-sensing chip. One technique for interconnecting such an environmental monitor or other monitoring and control devices is to utilize a dedicated maintenance bus. The maintenance bus is typically separate system's main data and control bus structure. The maintenance bus generally connects to a single, centralized point of control, often implemented as a peripheral component interconnect (PCI) device.

However, as discussed above, conventional maintenance bus architecture is not specifically designed for redundant operation. Accordingly, prior fault-tolerant systems have utilized a customized architecture for transmitting monitor and control signals over the system's main buses (or dedicated proprietary buses) using, for example, a series of application specific integrated circuits (ASICs) mounted on each circuit board being monitored. To take advantage of current, commercially available maintenance bus architecture in a fault tolerant computing environment, a more comprehensive and costeffective approach is needed.

Accordingly, it is an object of this invention to provide maintenance bus architecture having a high degree of fault-tolerance. This maintenance bus architecture should be interoperable with commercially available components and should allow a fairly high degree of versatility in terms of monitoring and control of important computer system components.

SUMMARY OF THE INVENTION

This invention overcomes the disadvantages of the prior art by providing a fault-tolerant maintenance bus architecture that includes two maintenance buses interconnecting each of a plurality of printed circuit boards, termed "parent" circuit boards. The two maintenance buses are each connected to a pair of system management modules (SMMs) that are configured to perform a variety of maintenance bus activities. The SMM can comprise any acceptable device for driving commands on the maintenance bus arrangement. Within each parent board are a pair of redundant bridges both having a unique address. One bridge is connected to the first maintenance bus while a second bridge is connected to the second maintenance bus of the pair. A child maintenance bus interconnects the two bridges through a "child" printed circuit board. The introduction of a separate board to implement the child maintenance bus can be useful, but is not essential according to this invention. The child maintenance bus is itself interconnected with a variety of monitor and control functions on maintenance bus-compatible subsystem components. The SMMs can address components on each child printed circuit board individually and receive appropriate responses therefrom. In the event of a bus or bridge failure, the SMM can still communicate with the child subsystem components via the redundant bus and bridge.

The bridge can include an interconnection to a further bridge. This remote bridge can, itself, be interconnected to additional microprocessors and associated memory. The remote bridge is addressed through one of the parent board's bridges so the communication to and from the SMM can occur. The SMM can be interconnected with a variety of other computer system peripherals and components, and can be accessed over a local network or through an Internet-based communication network.

BRIEF DESCRIPTION OF THE DRAWINGS

The foregoing and other objects and advantages of the invention will become more clear with reference to the following detailed description as illustrated by the drawings in which.

DETAILED DESCRIPTION OF AN ILLUSTRATIVE EMBODIMENT

Figure 1:
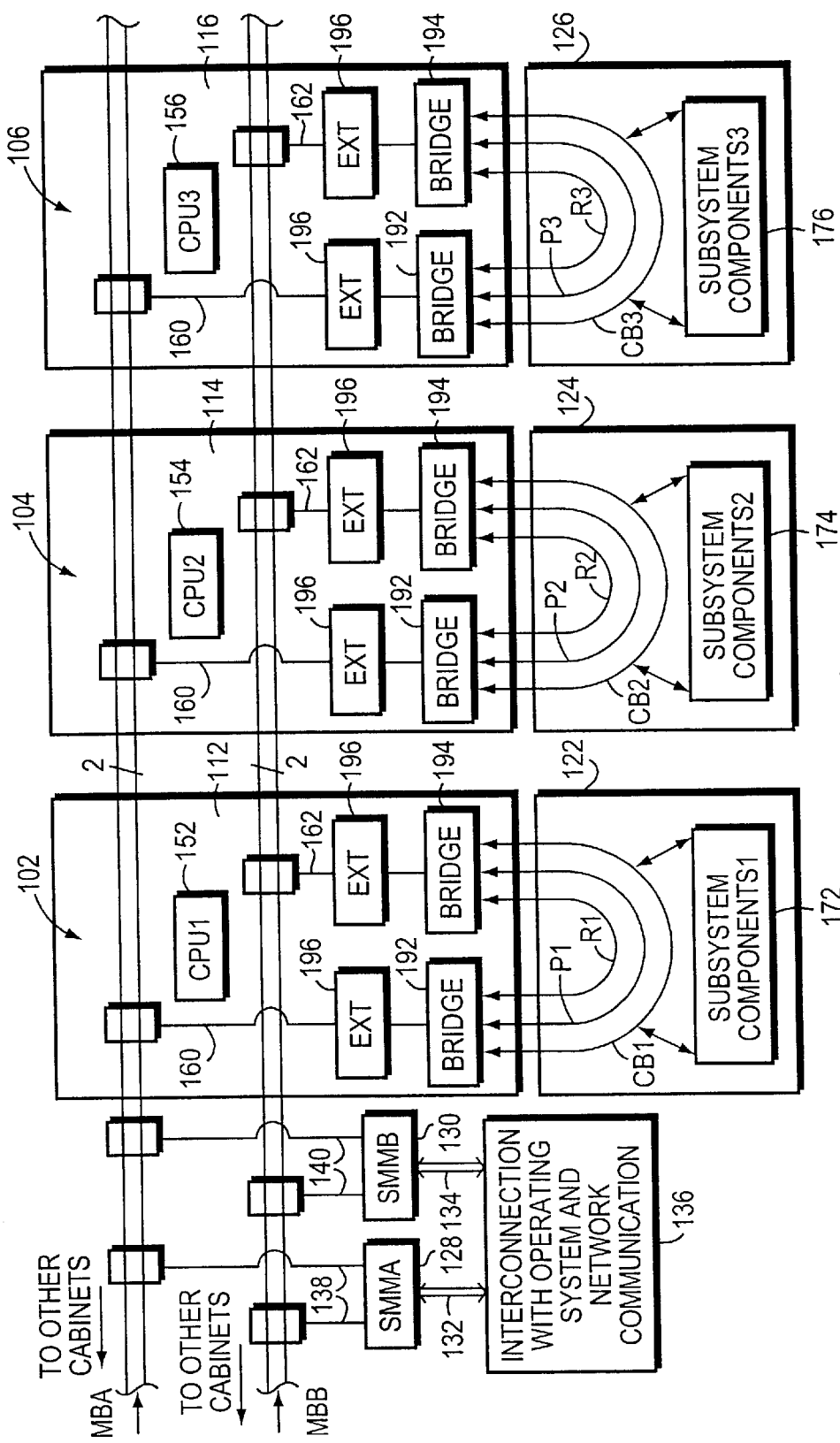
FIG. 1 is a block diagram showing an overview of a fault-tolerant maintenance bus architecture according to this invention.

FIG. 1 details a fault-tolerant maintenance bus architecture according to a preferred embodiment of this invention. A pair of parent maintenance buses MBA and MBB are shown. These maintenance buses are identical in architecture and can be implemented as a combination of cables, circuitry and circuit board traces. The buses MBA and MBB interconnect with a plurality of input/output (I/O) slots and pin locations within a cabinet that may contain a plurality of circuit boards. The parent maintenance buses MBA and MBB can also jump between cabinets in a larger computer system. It is generally contemplated that the buses are implemented in a multi-cabinet fault-tolerant server system, but the architecture according to this invention can be utilized in a variety of fault-tolerant computing configurations. According to a preferred embodiment, the buses MBA and MBB are each two-wire buses designed to take advantage of integrated circuit components utilizing the I$^2$C bus standard. The I$^2$C bus is a proprietary design of Philips Semiconductors of the Netherlands. This standard has become widely adopted for consumer electronics and various circuit applications, and is now supported by a large number of commercially available monitoring and control devices. Details on the use of the I$^2$C bus can be found in the *I$^2$C-bus and how to use it* (*including specifications*), April 1995 update, Chapter 3 by Philips Semiconductors. Typically, the bus is clocked at a speed of approximately 10 Kbytes/Sec. While I$^2$C is employed as the bus standard according to a preferred embodiment of this invention, it is expressly contemplated that other maintenance bus standards can be utilized according to the teachings of this invention with appropriate modifications.

To avoid signal loss over long distances, the parent buses MBA and MBB are amplified to generate a signal at 5V×30 mA. A variety of bus amplification circuits can be used. In particular, commercially available hardware bus extenders are employed. The amplified bus operates at a gain that is ten times the normal operating range for an I$^2$C bus (5V×3 mA). As described further below, this difference in operating level between the parent bus and various circuit components is compensated-for (on both sides) using the extender hardware.

In FIG. 1, three circuit board assemblies 102, 104 and 106 are shown. Each of these circuit board assemblies is interconnected with the bus pair (MBA and MBB). These board assemblies can represent a variety of computer system components. For example, the boards can together comprise a set of redundant identical boards or a set of separate functions including a central processing unit (CPU) board, "front panel" board and input/output (I/O) board. Each board assembly 102, 104 and 106 is defined functionally as a parent printed circuit board 112, 114 and 116 and an associated child printed circuit board 122, 124 and 126. As discussed above, while a separate board to implement the child maintenance bus can be useful according to an embodiment of this invention, it is not required. In general, the division between the parent board and child board is is somewhat arbitrary, and the actual physical structure for one or more boards can be implemented as a single plug-in printed circuit card residing in a connector socket or slot on a larger cabinet-based motherboard.

Also interconnected with the parent bus pair MBA and MBB are a pair of redundant system management modules (SMMs) identified herein as SMMA 128 and SMMB 130. Each SMM is a microprocessor-based component. The SMMs 128 and 130 each reside on a PCI bus 132 and 134. The SMM performs a variety of functions and includes both Ethernet and modem capabilities allowing it to interconnect with the computer operating system and other network communication structures (block 136). The SMM may also include other unrelated system components such as a video driver chip. The SMM is particularly based around a Motorola Power PC™ 860T microprocessor utilizing the VxWorks real-time operating system available from Wind River Systems, Inc. of Alameda, Calif. The term "system management module" (or SMM) is defined broadly to include any acceptable device for driving commands on the maintenance bus arrangement. While a microcontroller described above is used in a preferred embodiment, the SMM can be an application specific integrated circuit (ASIC), a programmable logic array, a microprocessor unit or any other command originator interconnected with the maintenance bus arrangement. The term "command module" is also used to define the SMM in its various possible embodiments.

Each SMM includes a pair of I$^2$C buses 138 and 140. Each pair is connected with a respective bus from the parent bus pair MBA and MBB. The SMMs are configured to operate in failover mode. In other words, SMMA operates under normal circumstances. In this mode SMMB monitors and communicates with SMMA over the shared I$^2$C bus, ready to take over for SMMA if it fails. If a failure is detected, then SMMB takes over operation but is otherwise largely idle, during normal run time. The function of the SMMs is described in further detail below. In summary, the SMMs carry information about components on each of the board assemblies 102, 104 and 106. The SMMs use this information to monitor and generally control the board assemblies. This information may be transferred to other parts of the computer system and over a network via the PCI bus.

Each parent board 112, 114 and 116 includes various data processing, display and communication capabilities in accordance with its purpose. Each board 112, 114 and 116 also includes a respective CPU (CPU1, CPU2 and CPU3) 152, 154 and 156, respectively.

Each CPU can comprise an Intel Pentium III™, Xeon™ or any other acceptable microprocessor having I$^2$C or equivalent maintenance bus architecture. Each board 112, 114 and 116 is interconnected with the parent buses MBA and MBB at various interconnection points, where appropriate. Since the parent bus is amplified by a gain by approximately ten times the normal I$^2$C operating level, interconnections with the parent buses can be made via bus extenders to be described further below.

Each parent board 112, 114 and 116 also includes a pair of interconnections 160 and 162 with each of the respective parent maintenance buses MBA and MBB. The interconnections 160 and 162 link to respective bridges 192 and 194. These bridges, in turn interconnect with respective child maintenance buses CB1, CB2 and CB3 to interconnect child board components. On each child board 122, 124 and 126 resides various control and monitoring subsystem components 172, 174 and 176, respectively. The subsystem components are described in further detail below. These components are each in communication with the maintenance bus using the preferred I$^2$C standard. The interconnection between each parent board and child board occurs via a pair of bridges 192 and 194. Each bridge is essentially identical in architecture, each pair of bridges 192 and 194 has the same different address for communication with the SMMs. The address of the bridge pair on each board, however differs so that the SMM can uniquely address a specific board. Addresses are established based upon the pin and socket arrangement for the respective bridge. It is useful to assign the same address to both bridges 192, 194 in the pair since they each reside on a different bus (MBA or MBB). For a given transaction, the SMM utilizes only one of the two bridges on a parent board to accomplish a task. The other, unused bridge in the pair can be used if the SMM cannot complete the transaction with the original bridge. As noted above, in order provide an amplified parent bus signal and an appropriate signal level to the subsystem bridges, bus extender hardware is in employed. The bus extender hardware is available from Phillip Semiconductors under part number 82B715. Using amplified parent buses, approximately thirty or more loads can be carried. The extender acts as a buffer for signals traversing the extender hardware providing the necessary amplification and deamplification. Extender components 196 are provided between the parent buses MBA and MBB and corresponding bridge interconnections 160 and 162. While not shown, interconnections 160 and 162 can also include appropriate series resistors and FET triggers in line with the extender components 196 in accordance with the 82B715 hardware manufacturer's data sheet.

The bridges 192 and 194 each act as store-forward devices in the transfer of I²C signals into and out of the child board subsystem. In other words, the bridges receive packetized signals from the SMMs and transfer them to appropriate I²C-compatable maintenance bus ports on subsystem components. Likewise, the bridges receive signal from subsystem components and transfers them back to the SMMs. In order to provide desired fault-tolerance, two bridges 192 and 194 are employed, each communicating with one of the dual parent buses MBA and MBB. In this manner, the failure of a single bridge or parent bus does not cause a lost of connection between the subsystem components and SMMs. This is because each child bus CB1, CB2 and CB3 is interconnected with both bridges simultaneously. The subsystem components are accessed via the child bus. A reset connection (R1, R2 and R3) and power connection (P1, P2 AND P3) extend from each bridge in the pair. A reset and/or power command from an SMM to the active bridge in the pair is used to power-up or reset the underlying board assembly. The SMMs are configured to provide independent reset and power commands to the bridges 192 and 194, to allow powering and reset of each underlying board through the maintenance bus arrangement. In general, the active bridge performs power-up. However, the bridges are configured to handshake, or otherwise communicate, to ensure that the board hardware is functioning properly before power-up occurs generally within the board.

According to a preferred embodiment, each bridge 192, 194 comprises a commercially available Intel 87C54 microcontroller. This circuit package includes a built-in programmable storage device (an erasable programmable read-only memory EPROM) and 256 bytes of random access memory (RAM). This package is relatively low-cost and complete. Data traveling over the I²C bus is buffered in the RAM while basic routing and power control functions are preprogrammed into the bridge microcontroller EPROM. Though the 87C54 is the preferred embodiment, any microcontroller with sufficient I/O ports to drive both parent and child maintenance buses could instantiate the bridges 192 and 194.

Figure 2:
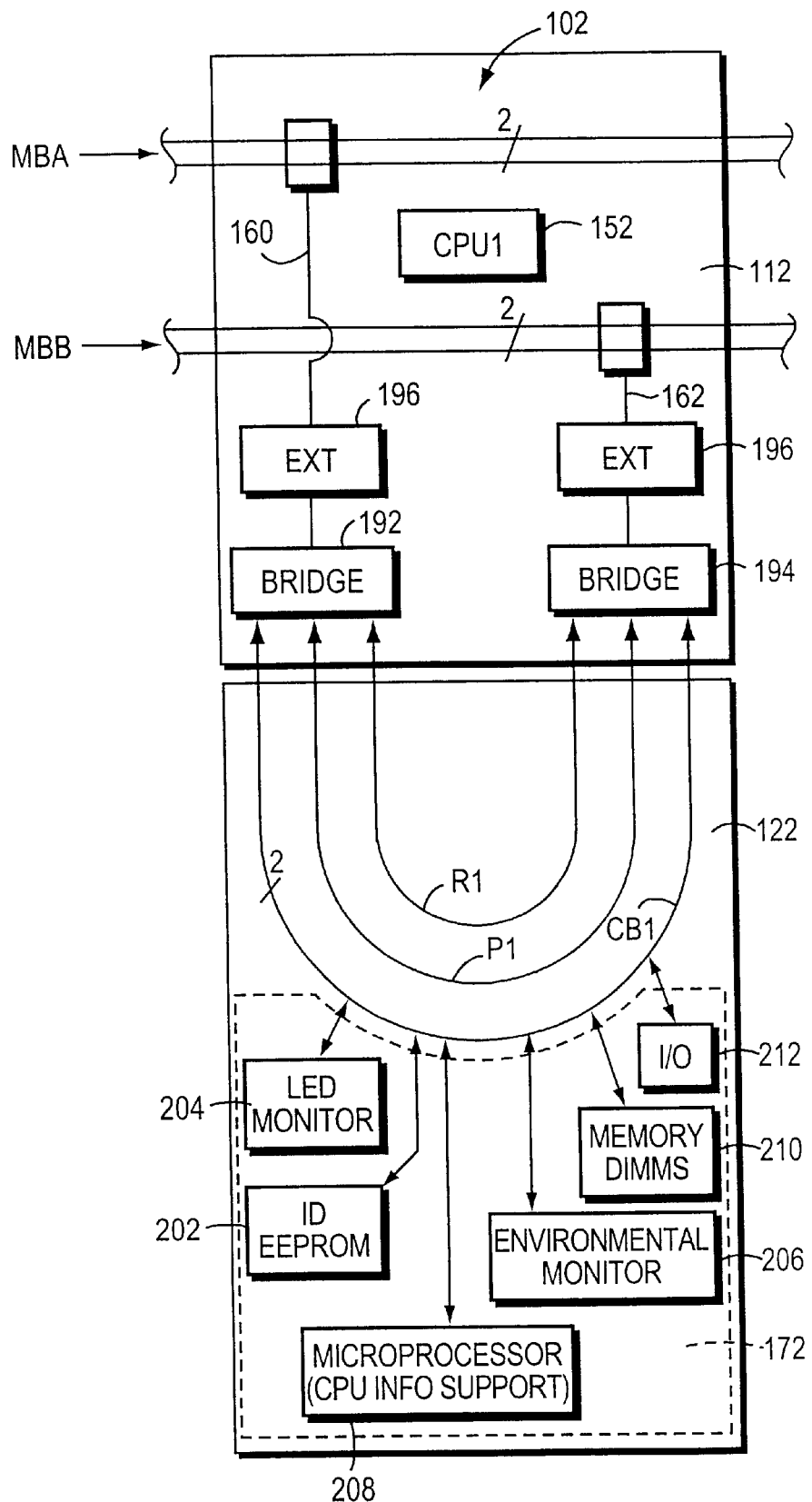
FIG. 2 is a more detailed block diagram showing one parent and child printed circuit board implementing a fault-tolerant maintenance bus according to this invention.

With further reference to FIG. 2, the exemplary parent board assembly 102 is shown in further detail. Particularly, the subsystem components 172, interconnected with the I²C bus are illustrated. The electrically erasable programmable read only memory (EEPROM) carrying the board identification (ID), generally termed the IDEEPROM 202, is provided on the bus. In addition, a light-emitting diode (LED) monitor 204 is provided. This LED provides a visible indication of the status of the board for an operator of the board. In addition, an environmental monitor chip 206 having I²C compatibility is provided. This chip typically monitors temperature and other important functions and transmits appropriate data and/or alarms regarding environment. Microprocessor information from CPU1 (152) is also interconnected with the bus CB1 via an I²C interconnection. The CPU support information 208 is transmitted over the I²C bus, as well as other important status data. I²C interconnections with the dual inline memory module sockets (DIMMS) 210 of the board assembly are also provided by the child bus CB1. In addition, other I/O ports 212 with I²C capabilities may be serviced by the child bus CB1.

It is generally contemplated that the SMMs communicate with the bridges 192 and 194 via data packets, sent over the I²C bus with appropriate destination addresses. In general, each bridge and subsystem component contains its own unique address on the maintenance bus that make it identifiable by the SMMs. The SMMs have knowledge of the subsystem components on each board. Packets sent to and from the SMM have the bridge identification and the data within the packet is used to identify the particular subsystem device. A variety of protocols and communication techniques can be used according to this invention. Heretofore, I²C connections have operated using a highly simplified communication scheme without the benefit of addressing and protocol techniques.

Because of the fault-tolerant nature of the bus arrangement and bridge system, addressing of control and monitor functions between the SMMs and the appropriate bridge are highly desirable. One such protocol is taught in the co-pending, commonly owned U.S. patent application Ser. No. 09/548,202, entitled *Fault-Tolerant Maintenance Bus Protocol* by A. Charles Suffin, which is expressly incorporated herein by reference. Briefly, the protocol is controlled by the active SMM and includes a variety of data and response byte code proceeded by an appropriate address. The byte codes activate and/or poll the various subsystem components which return corresponding responses addressed to the active SMM. Certain functions such as power-up and reset are executed by the bridge itself, while others are past through the bridge onto the child bus CB1. Packets can include checksum features to enhance fault-tolerance. Both the bridge and SMM count the number of received bytes and compare that result to the checksum.

If the numbers do not match, then the packet is discarded. Other features of the exemplary protocol are described further in the incorporated patent application.

Figure 3:
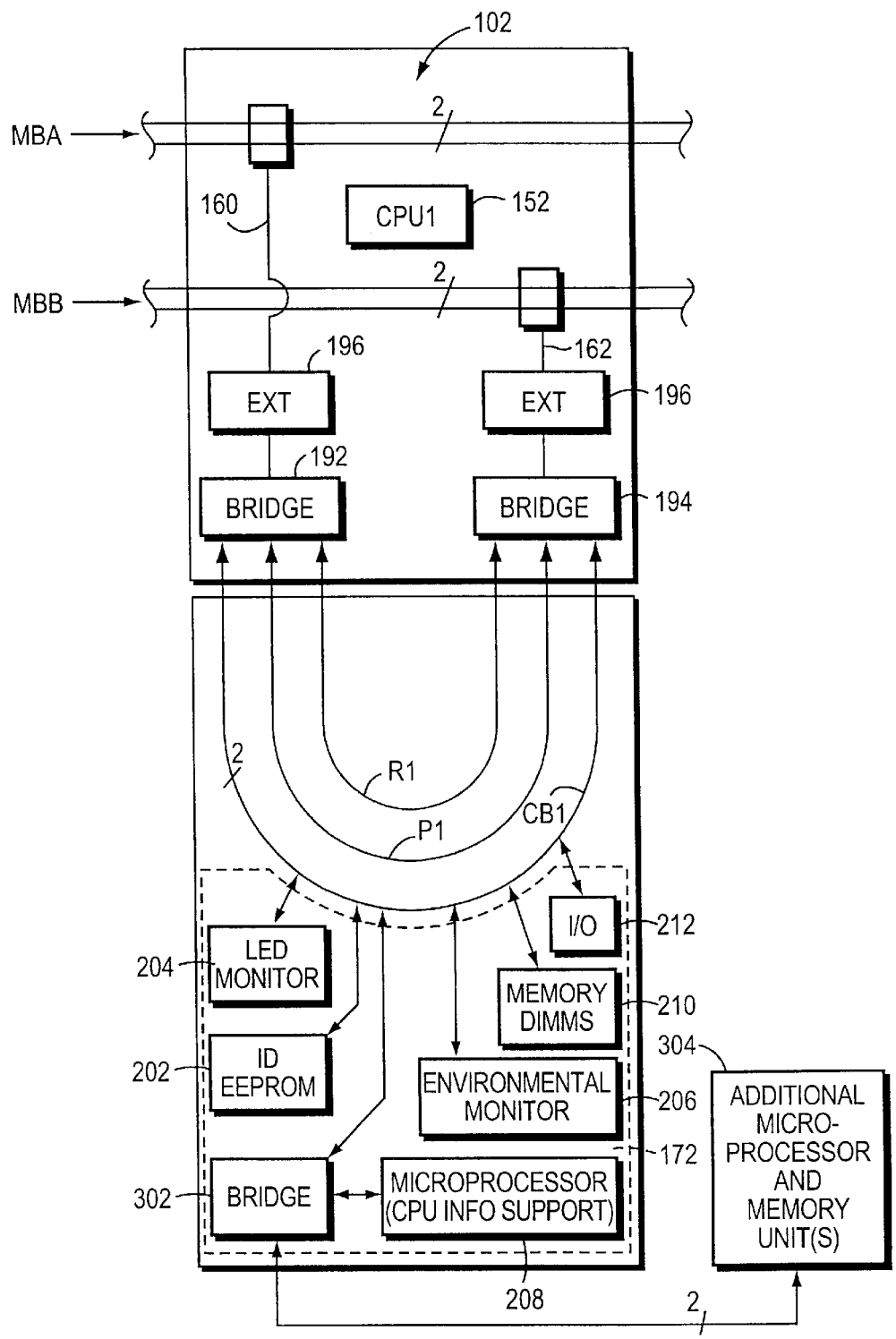
FIG. 3 is the board of FIG. 2 including a bridge for accessing a remote microprocessor board according to an alternate embodiment.

Reference is now made to FIG. 3, which again illustrates the exemplary board assembly 102. The subsystem 172 of this board includes the set subsystem components described above with reference to FIG. 2. In addition, another bridge 302 is interconnected the child bus CB1. This bridge is similar in configuration to the bridges 192 and 194, and can be constructed from the same type of microcontroller circuit. The bridge 302 includes another discrete address that is recognized by the SMM so that data is transferred via the bridges 192, 194 to the subordinate bridge 302 as if it were any travelling to any other subsystem component. Note that the bridge addressing arrangement according to this embodiment enables components to be accessed with relatively small addresses (typically one byte). Once received, the bridge 302 stores and forwards the message to the I²C-compatable ports on further computer circuitry 304. Note that the CPU information block 208 is connected through the subordinate bridge 302 according to FIG. 3. According to this embodiment, the processor information is located behind the child bridge, accounting for the depicted arrangement. In this example, the circuitry 304 includes another microprocessor (such as an Intel Xeon™) and/or associated memory and other peripherals. The above-described protocol enables messages to be transferred from the child bus through bridges to additional, subordinate bridges (such as bridge 302). Further components, such as circuitry 304, can be accessed through these subordinate bridges.

It should now be clear that the foregoing architecture enables an effective and low-cost technique for implementing a fault-tolerant maintenance bus within a number of separate computer components.

The foregoing has been a detailed description of a preferred embodiment. Various modifications and additions can be made without departing from the spirit and scope of the invention. For example, while the maintenance bus is implemented as an $I^2C$ standard, it can be implemented in any other acceptable standard and the number of lines in the bus can be varied from the two lines shown. While a serial maintenance bus is utilized, it is contemplated that a parallel bus can be employed according to an alternate embodiment. Various components such as bridges and SMMs can be implemented using a variety of commercially available and customized circuits. Accordingly, this description is meant to be taken only by way of example, and not to otherwise limit the scope of the invention.

What is claimed is:

1. A maintenance bus architecture for a fault-tolerant computer system having a plurality of circuit board assemblies and maintenance bus-compatible subsystem components thereon comprising:

a first parent maintenance bus and a second parent maintenance bus interconnecting to each of the plurality of circuit board assemblies;

a command module interconnected with each of the first parent maintenance bus and the second parent maintenance bus, the command module being constructed and arranged to transmit and receive control and monitor data over the first parent maintenance bus and the second parent maintenance bus in a predetermined format;

a first bridge and a second bridge associated with each of the plurality of circuit boards; each first bridge being interconnected with the first parent maintenance bus and each second bridge being connected with the second parent maintenance bus;

a child maintenance bus interconnected between the first bridge and the second bridge, the child maintenance bus being interconnected to predetermined ports on each of the maintenance bus-compatible subsystem components; and wherein each of the first bridge and the second bridge are constructed and arranged to transfer the control and monitor data addressed thereto between the child maintenance bus and the first parent maintenance bus and second parent maintenance bus, respectively, only one of the first bridge and the second bridge being active to transfer the control and monitor data at a given time.

2. A maintenance bus architecture for a fault-tolerant computer system having a plurality of circuit board assemblies and maintenance bus-compatible subsystem components thereon comprising:

a first parent maintenance bus and a second parent maintenance bus interconnecting to each of the plurality of circuit board assemblies;

a command module interconnected with each of the first parent maintenance bus and the second parent maintenance bus, the command module being constructed and arranged to transmit and receive control and monitor data over the first parent maintenance bus and the second parent maintenance bus in a predetermined format;

a first bridge and a second bridge associated with each of the plurality of circuit boards; each first bridge being interconnected with the first parent maintenance bus and each second bridge being connected with the second parent maintenance bus;

a child maintenance bus interconnected between the first bridge and the second bridge, the child maintenance bus being interconnected to predetermined ports on each of the maintenance bus-compatible subsystem components; and wherein each of the first bridge and the second bridge are constructed and arranged to transfer the control and monitor data addressed thereto between the child maintenance bus, the first parent maintenance bus, and the second parent maintenance bus, respectively, only one of the first bridge and the second bridge being active to transfer the control and monitor data at a given time, the first bridge and the second bridge including reset and power connections therebetween and the command module is constructed and arranged to transmit reset and power signals directly to each of the first bridge and the second bridge to thereby control power and reset of components on the respective one of the board assemblies.

3. The maintenance bus architecture as set forth in claim 2 wherein each of the first bridge and the second bridge and each of the subsystem components is constructed and arranged to be uniquely identified by the command module.

4. The maintenance bus architecture as set forth in claim 3 wherein each of the subsystem components includes maintenance bus ports arranged according to a two-wire $I^2C$ maintenance bus standard interconnected with the child maintenance bus and wherein each of the first parent maintenance bus, the second parent maintenance bus and the child maintenance bus are arranged according to the two-wire $I^2C$ maintenance bus standard.

5. The maintenance bus architecture as set forth in claim 4 further comprising another command module interconnected to each of the first parent maintenance bus and the second parent maintenance bus, the other command module being constructed and arranged to monitor the command module and to provide backup for the command module.

6. The maintenance bus architecture as set forth in claim 5 wherein the subsystem components include an environmental monitor, an IDPROM for the circuit board and an LED indicator.

7. The maintenance bus architecture as set forth in claim 5 further comprising a bus extender for amplifying the first parent bus and the second parent bus and for providing a deamplified signal to the first bridge and the second bridge.

8. The maintenance bus architecture as set forth in claim 5 further comprising a third bridge interconnected with the child bus constructed and arranged to transfer the monitor and control data from the child bus to a maintenance bus-compatible port of a remote circuit.

9. The maintenance bus architecture as set forth in claim 8 wherein the remote circuit comprises a microprocessor.

10. A method for enabling a plurality of circuit board assemblies to monitor and control maintenance bus-compatible subsystem components in a fault-tolerant computer having a redundant maintenance bus architecture, the method comprising the steps of:

(a) connecting a first parent maintenance bus and a second parent maintenance bus to each of a plurality of circuit board assemblies;

(b) connecting a command module to the first parent maintenance bus and the second parent maintenance bus;
(c) associating a first bridge and a second bridge with each one of the plurality of circuit board assemblies;
(d) connecting each first bridge with the first parent maintenance bus and each second bridge with the second parent maintenance bus;
(e) interconnecting a child maintenance bus between the first bridge and the second bridge;
(f) connecting the child maintenance bus to a predetermined port on a maintenance bus-compatible subsystem component;
(g) transmitting and receiving by the command module control and monitor data in a predetermined format over the first parent maintenance bus and the second parent maintenance bus; and
(h) transferring the control and monitor data addressed to each of the first bridge and the second bridge between the child maintenance bus, the first parent maintenance bus, and the second parent maintenance bus, respectively, only one of the first bridge and the second bridge being active to transfer the control and monitor data at a given time.

* * * * *